United States Patent
Spieth

(10) Patent No.: US 11,802,540 B2
(45) Date of Patent: Oct. 31, 2023

(54) WIND TURBINE AND ROTOR BLADE FOR A WIND TURBINE

(71) Applicant: Wobben Properties GmbH, Aurich (DE)

(72) Inventor: Falk Spieth, Aurich (DE)

(73) Assignee: Wobben Properties GmbH, Aurich (DE)

( * ) Notice: Subject to any disclaimer, the term of this patent is extended or adjusted under 35 U.S.C. 154(b) by 50 days.

(21) Appl. No.: 16/962,757

(22) PCT Filed: Jan. 16, 2019

(86) PCT No.: PCT/EP2019/051031
§ 371 (c)(1),
(2) Date: Jul. 16, 2020

(87) PCT Pub. No.: WO2019/141720
PCT Pub. Date: Jul. 25, 2019

(65) Prior Publication Data
US 2020/0355157 A1     Nov. 12, 2020

(30) Foreign Application Priority Data

Jan. 17, 2018 (DE) .................. 10 2018 100 963.1

(51) Int. Cl.
*F03D 1/06* (2006.01)
(52) U.S. Cl.
CPC ......... *F03D 1/0675* (2013.01); *F03D 1/0658* (2013.01); *F03D 1/0683* (2013.01);
(Continued)
(58) Field of Classification Search
CPC .... F03D 1/0675; F03D 1/0683; F03D 7/0232; F03D 1/0641; F05B 2240/311; F05B 2240/3052
See application file for complete search history.

(56) References Cited

U.S. PATENT DOCUMENTS 7,909,576 B1 * 3/2011 van der Bos ........... F03D 80/00
                                                              416/235
8,087,889 B2 * 1/2012 Meldgaard ............ F03D 7/0256
                                                              416/41
(Continued)

FOREIGN PATENT DOCUMENTS

DE        10233102 B4 *  2/2006  ........... F03D 7/0236
DE    102005040479 A1     3/2007
(Continued)

OTHER PUBLICATIONS

English translation of DE10233102B4 (Year: 2006).*
English translation of WO2016012239A1 (Year: 2016).*
English translation of WO2015150358A1 (Year: 2015).*

*Primary Examiner* — Igor Kershteyn
*Assistant Examiner* — Wesley Le Fisher
(74) *Attorney, Agent, or Firm* — SEED INTELLECTUAL PROPERTY LAW GROUP LLP

(57) ABSTRACT

A rotor blade for a wind turbine, comprising a rotor blade root for fixing the rotor blade to the hub of a wind turbine, an inner blade portion which extends from the rotor blade root in the direction of a longitudinal extension of the rotor blade, and a rear edge segment for increasing the depth of the rotor blade in the profile depth direction in the region of the inner blade portion, wherein the rear edge segment is fixed to the inner blade portion and has an edge facing the inner blade portion. A cover lip is proposed which overlaps with the edge and is arranged in a transition region from the inner blade portion to the edge of the rear edge segment.

18 Claims, 5 Drawing Sheets

(52) U.S. Cl.
CPC . *F05B 2240/2212* (2013.01); *F05B 2240/302* (2013.01); *F05B 2240/57* (2013.01)

(56) References Cited

U.S. PATENT DOCUMENTS

| | | | | |
|---|---|---|---|---|
| 8,123,883 | B2* | 2/2012 | Llorente Gonzalez | ..................... B29C 70/32 156/193 |
| 8,242,618 | B2* | 8/2012 | Numajiri | ................. F03D 80/70 290/44 |
| 8,317,479 | B2* | 11/2012 | Vronsky | ............... F03D 1/0641 416/196 R |
| 8,403,642 | B2 | 3/2013 | Carroll et al. | |
| 8,517,682 | B2* | 8/2013 | Hancock | ............... F03D 7/0232 416/240 |
| 9,057,359 | B2* | 6/2015 | Fuglsang | ............. F03D 1/0641 |
| 9,145,869 | B2* | 9/2015 | Thomsen | ................ F03D 80/70 |
| 10,436,175 | B2* | 10/2019 | Kuhn | ...................... F03D 80/30 |
| 10,458,389 | B2* | 10/2019 | Majumder | ............ F03D 1/0633 |
| 10,473,085 | B2* | 11/2019 | Spieth | ..................... F03D 13/40 |
| 10,760,544 | B2* | 9/2020 | Yarbrough | ............ F03D 1/0675 |
| 2008/0265627 | A1 | 10/2008 | Bodirsky et al. | |
| 2009/0028705 | A1* | 1/2009 | Meldgaard | ........... F03D 1/0675 416/23 |
| 2009/0104038 | A1* | 4/2009 | Grabau | ................ F03D 1/0641 416/223 R |
| 2010/0028161 | A1* | 2/2010 | Vronsky | ............... F03D 1/0641 416/241 A |
| 2010/0127504 | A1* | 5/2010 | Hancock | ............... F03D 1/0641 416/223 R |
| 2010/0247314 | A1 | 9/2010 | Narasimalu | |
| 2012/0169060 | A1 | 7/2012 | Loh et al. | |
| 2014/0227100 | A1 | 8/2014 | Godichon et al. | |
| 2014/0328691 | A1 | 11/2014 | Hoffmann et al. | |
| 2017/0016426 | A1* | 1/2017 | Kuhn | ....................... F03D 80/30 |
| 2017/0159642 | A1* | 6/2017 | Spieth | .................. F03D 1/0641 |
| 2018/0274518 | A1 | 9/2018 | Spieth et al. | |

FOREIGN PATENT DOCUMENTS

| | | |
|---|---|---|
| DE | 102012109170 A1 | 3/2013 |
| DE | 102012111195 A1 | 12/2013 |
| DE | 102014214220 A1 | 1/2016 |
| DE | 102015116634 A1 | 4/2017 |
| WO | 2011/088835 A2 | 7/2011 |
| WO | WO-2015150358 A1 * 10/2015 ........... F03D 1/0675 |
| WO | WO-2016012239 A1 * 1/2016 ........... F03D 1/0641 |
| WO | 2018/224225 A1 | 12/2018 |

* cited by examiner

WIND TURBINE AND ROTOR BLADE FOR A WIND TURBINE

BACKGROUND

Technical Field

The invention relates to a rotor blade for a wind turbine.

Description of the Related Art

In the German application on which priority is based, the German Patent and Trademark Office searched the following documents: DE 10 2005 040 479 A1, DE 10 2012 109 170 A1, DE 10 2012 11 195 A1, DE 10 2014 214 220 A1, DE 10 2015 116 634 A1.

Rotor blades of the kind that have a plurality of sections or segments in the direction of rotor rotation are known. It has proved advantageous to design such rotor blades, particularly those with very large rotor diameters, not entirely in one piece, but rather in such a way that an inner blade portion and a rear edge segment are produced separately from each other, at least in part, and then joined together. If necessary, the components can be joined together in the one production plant, immediately before a rotor is mounted on wind turbine, or at an assembly site set up for that purpose. Once such an inner blade portion has been joined to a respective rear edge segment, a surface gap typically ensues in the transition region between the two segments. Given that many forces and moments, such as centrifugal forces, act on the rotor blade during operation and that the blade may be exposed at the same time to different temperatures, the size of the gap formed between the inner blade portion and the rear edge segment is liable to change.

As a general principle, a high level of aerodynamic quality and in particular as flat and continuous a blade surface as possible in the region of transition from the inner blade portion to the rear edge segment is to be aimed at for rotor blades, so that drag-inducing vortices can be limited or prevented as far as possible. The aim is to reduce the flow resistance of such a rotor blade and to optimize the power yield of the wind turbine.

In the past, in order to reduce the transition gap between the inner blade portion and the rear edge segment, a wedge-shaped element was arranged at the transition between them. The main purpose of this element, also called a contour wedge, is to enable the transition from the inner blade portion to the rear edge segment to be streamlined and as continuous as possible. Such a contour wedge is typically joined securely to the inner blade portion. However, even when using such a contour wedge, it was necessary, in the event of bending stresses, torsional moments and temperature changes with associated material expansion acting on the components, to provide a certain gap between the contour wedge arranged on the inner blade section, and the rear edge segment, in order to prevent the affected components from coming into contact with each other and being exposed to stresses that can damage the blades.

Although aerodynamic advantages could already be achieved by using such a contour wedge, compared to a solution without such a wedge, the gap between the inner blade section and the rear edge segment continued to be a source of aerodynamic disruption.

BRIEF SUMMARY

Provided is a rotor blade having a higher degree of aerodynamic efficiency, without being prone to damage from wear and tear.

Provided is a rotor blade for a wind turbine, comprising a rotor blade root for fixing the rotor blade to the hub of a wind turbine, an inner blade portion which extends from the rotor blade root in the direction of a longitudinal extension of the rotor blade, and a rear edge segment for increasing the depth of the rotor blade in the profile depth direction in the region of the inner blade portion, wherein the rear edge segment is fixed to the inner blade portion and has an edge facing the inner blade portion.

Provided is a rotor blade of the kind initially specified by arranging, in a transition region from the inner blade portion to the edge of the rear edge segment, a cover lip which overlaps the edge.

The invention makes use of the discovery that such a cover lip overlapping the edge of the rear edge segment is able to improve the surface quality and the surface continuity of such a transition from the inner blade portion to the rear edge segment, thus allowing an aerodynamic flow to pass such a surface with less resistance.

Overlapping the edge of the rear edge segment simultaneously ensures greater relative mobility between the inner blade portion and the edge of the rear edge segment, thus allowing forces and moments that arise during operation, and in particular component deformations resulting from different temperatures to be compensated, because the rear edge segment and the cover lip do not lie in flush contact. The cover lip is dimensioned such that, even when there is relative movement of the inner blade portion relative to the edge of the rear edge segment, the formation of a gap between the two components is prevented. The aerodynamic efficiency and hence the efficiency of such a rotor compared to the solutions known from the prior art is thus improved overall.

The cover lip overlaps a transition region from the inner blade portion to the edge of the rear edge segment. Such an overlap of the transition from the inner blade portion to the edge of the rear edge segment has proved to be particularly suitable for guiding the flow with as little resistance as possible over the transition between the two segments. The cover lip is preferably adapted to the spatial contour of the edge. To that end, the cover lip is provided in the form of a flat element or as a curved surface, depending on the prevailing aerodynamic conditions.

According to a preferred embodiment of the invention, the cover lip extends at least in sections or completely in the direction of the rotor blade's longitudinal extension. It has proved to be advantageous, in rotor blades for powerful wind turbines, to subdivide the rear edge segment additionally into individual segments along the rotor blade's longitudinal extension. In such a case, it is advantageous to subdivide the cover lip as well into individual sections and accordingly to assign to each section of the rear edge segment a single cover lip which extends in the direction of the rotor blade's longitudinal extension. At the same time, it may be advantageous for rotor blades with integral rear edge segments to use a single cover lip that extends completely or substantially completely in the direction of the rotor blade's longitudinal extension and along the rear box section of the rotor blades.

The cover lip preferably has a pocket with a depth, in which the edge of the rear edge segment is received movably along the depth of the pocket. The pocket cradles the edge of the rear edge segment, in particular, so although the edge of the rear edge segment is movable along the depth of the pocket, it is always in contact with the pocket perpendicular to the direction of rotation of the rotor blade. This ensures that the cover lip does not lift off from the rear edge segment, thus producing a gap. At the same time, however, it is still possible for the edge of the rear edge segment to move along the depth of the pocket, thus preventing stresses from being introduced into the components.

The cover lip preferably has a base member made of a fiber-reinforced plastic, in particular of fiberglass-reinforced plastic (GFRP). According to another alternative embodiment of the invention, however, it is also possible to use carbon fiber-reinforced plastic (CFRP) or other fiber composites, or as combinations of several different fiber types, for example glass fibers and carbon fibers. As the inner blade portion and the rear edge segment typically include significant proportions of GFRP, using GFRP also for the base member of such a cover lip has proved advantageous.

According to a preferred development of the invention, the pocket has one or more anti-friction members with an anti-friction surface for slidingly receiving the edge of the rear edge segment. To allow the edge of the rear edge segment to move along the depth of the pocket with as little resistances as possible, it has proved advantageous to form anti-friction surfaces on the two areas of the pocket that are in contact with the edge of the rear edge segment. The advantage of forming such anti-friction surfaces is that material wear and tear is reduced not only in the region of the pocket, but also in the region of the edge of the rear edge segment. Alternatively or additionally thereto, the anti-friction surfaces are arranged on the edge of the rear edge segment.

The anti-friction surface is made of a thermoplastic plastic. The pairing between the rear edge segment and the cover lip is very durable as a result, because the thermoplastic plastic slides on the fiber-reinforced plastic, in particular the GFRP, of the rear edge segment with little wear being produced.

In a preferred embodiment of the invention, a fabric laminate is arranged on a side of the anti-friction member facing away from the anti-friction surface. In other words, the fabric laminate is arranged on the side of the anti-friction member that faces away from the inside of the pocket. The fabric laminate is preferably rolled (calendered) into the anti-friction member during extrusion of same. The fabric is then joined securely to the anti-friction member by undercuts (microserration). The fabric used for lamination is preferably a polyester fabric, in particular a polyester stretch fabric having a weight per unit area of 200-250 g/m².

The fiber-reinforced plastic of the cover lip preferably has a matrix into which the fibers are embedded, wherein the fabric laminate is joined to the matrix of the fiber-reinforced plastic and more particularly is embedded therein. The secure join between the anti-friction member and the fiber-reinforced plastic is achieved in a particularly preferred embodiment by joining the matrix material of the fiber-reinforced plastic to the fabric laminated side of the anti-friction member, in particular on the basis of undercuts (microserration). The fiber composite material of the cover lip is then fixed itself and it can be joined durably and stably to the anti-friction member if the selected matrix material is one that can otherwise be joined only poorly or not at all to a thermoplastic material.

The matrix material is preferably selected from the list comprising: epoxy resins, polyester resins, in particular unsaturated resins, vinyl resins, phenol formaldehyde resins, diallyl phthalate resins, methacrylate resins, polyurethane resins and amino resins.

It is further preferred that the thermoplastic plastic be selected from the list: polyoxymethylene (POM), polyethylene terephthalate (PET-P), polyamide 6 (PA 6), polyketone (PK), polyvinylidene fluoride (PVDF) and polypropylene (PP). The materials have high stiffness, low coefficients of friction, good dimensional stability and thermal stability.

According to a preferred development of the invention, the cover lip (216, 216', 216'') has a base member with a first end and a second end, wherein the pocket is arranged at the first end and an attachment portion for attachment to the inner blade portion is arranged at the second end opposite the pocket. The attachment portion of the cover lip can be attached to the inner blade portion by adhesive bonding, in particular. In order to support durable bonding, the attachment portion preferably has a surface enlargement, preferably in the form of a surface which has been roughened in comparison with other surface portions of the base member.

It is also preferred that a seal, in particular a rubber seal, having a sealing profile is arranged on the attachment portion. The sealing profile is preferably selected from the shapes: groove profile, trapezoidal profile, rounded profile, hollow profile, U-shaped profile, angle profile or special profile. Such a seal is used, in particular, for locally limiting the adhesive surface and prevents the adhesive from running inadvertently to the sides, i.e., from being distributed over a large area, in particular toward the edge of the rear edge segment. Such a seal also increases the stability of the adhesive bond and in addition supports the formation of a wedge-shaped cover lip profile relative to the inner blade portion. Such a wedge-shaped profile has proved to be aerodynamically advantageous.

According to a preferred embodiment of the invention, the inner blade portion has a circular or oval, in particular an elliptical cross-section. Near the blade root, the inner blade portion forms the leading edge of the rotor blade, so the shape of the inner blade portion thus has a substantial influence on the aerodynamic characteristics of the rotor blade near the blade root.

According to another embodiment of the invention, the inner blade portion is provided in the form of a wound body. Such a wound body can be manufactured semi-automatically.

The invention has been described above with reference to a rotor blade. The invention relates in another aspect to a wind turbine comprising a tower, a nacelle mounted rotatably on the tower, a rotor mounted rotatably on the nacelle, and a plurality of rotor blades attached to the rotor. The invention achieves the initially specified benefits with respect to the wind turbine by at least one rotor blade being designed according to one of the embodiments described in the foregoing.

The wind turbine utilizes the same advantages and preferred embodiments as the rotor blade according to the invention. Reference is made in this regard to the observations above, the content of which is incorporated here by reference.

BRIEF DESCRIPTION OF THE SEVERAL VIEWS OF THE DRAWINGS

The invention shall now be described in greater detail with reference to a preferred embodiment and the attached Figures, in which.

DETAILED DESCRIPTION

Figure 1:
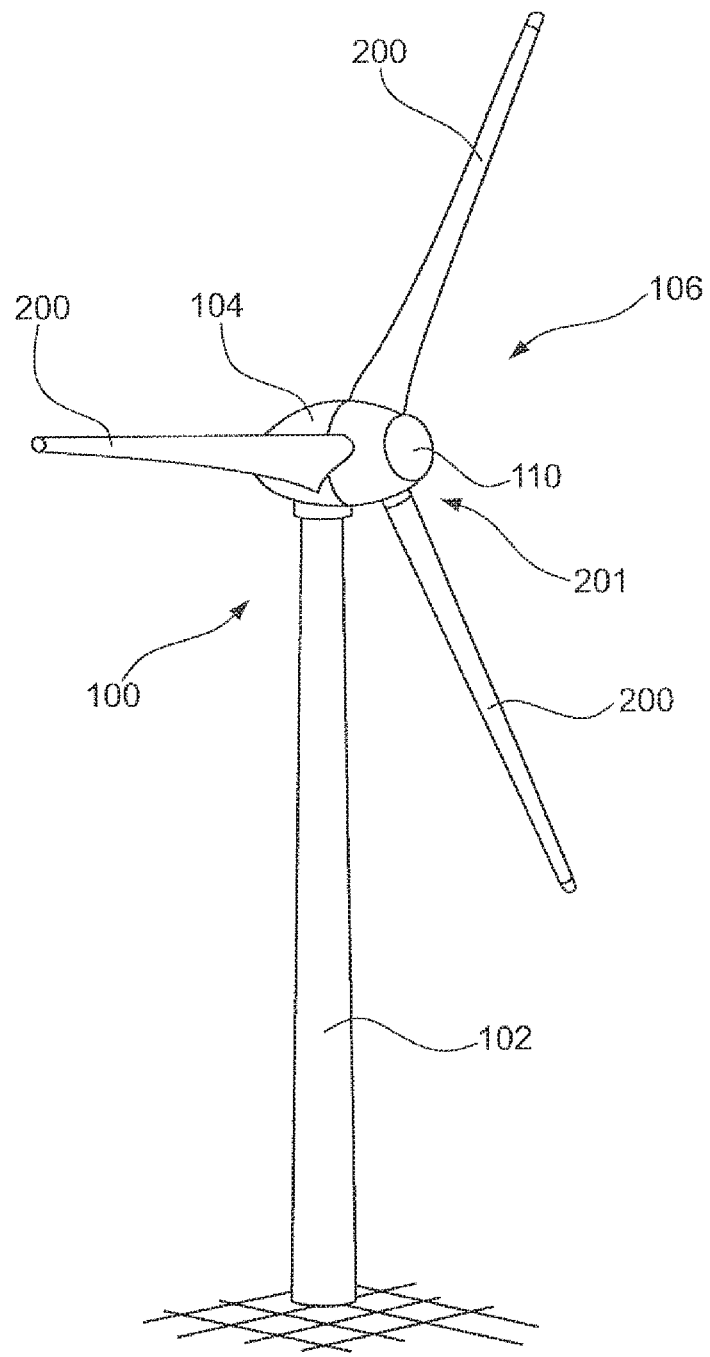
FIG. 1 shows a perspective view of a wind turbine.

FIG. 1 shows a wind turbine 100 comprising a tower 102 and a nacelle 104.

A rotor 106 is arranged on nacelle 104 by means of a rotor blade root 201. Rotor 106 has three rotor blades 200 that are each connected by a rotor blade root 201 to a spinner 110. In operation, rotor 106 is made to rotate by the wind, thus driving a generator (not shown) in nacelle 104, which converts the rotational energy of rotor 106 into electrical current.

Figure 2:
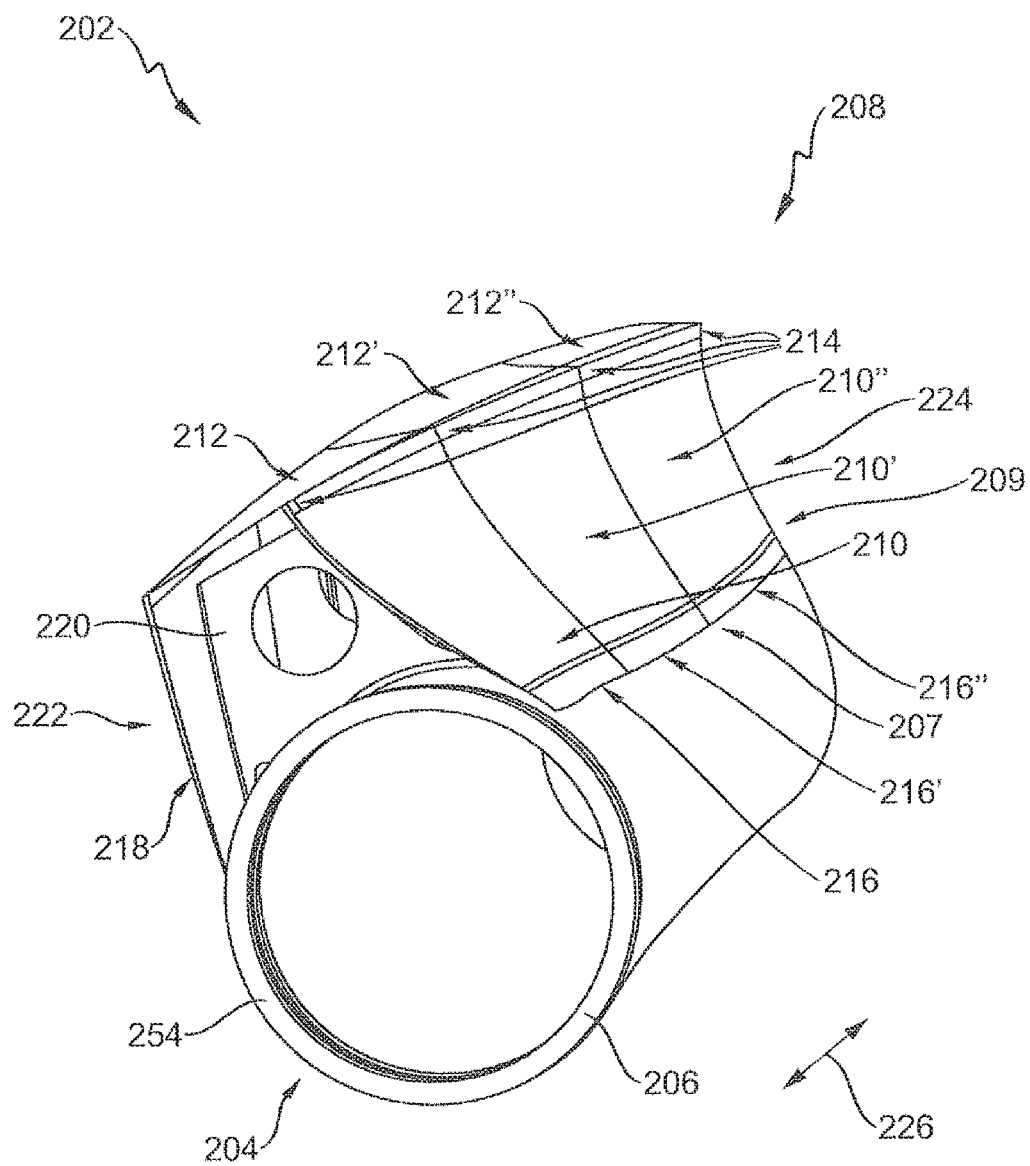
FIG. 2 shows a rotor blade segment of a wind turbine, as shown in FIG. 1.

FIG. 2 shows a rotor blade segment 202 of one of the rotor blades 200 shown in FIG. 1. Rotor blade segment 202 has an inner blade portion 204 and a rear edge segment 208 for increasing the depth of rotor blade 200 in a profile depth direction (205) (see FIG. 3). In the longitudinal direction of rotor blade segment 202, the rear edge segment 208 is embodied here in two parts, although only the section of rear edge segment 208 facing inner blade portion 204 is shown.

The inner blade portion 204 has a wound body 206 and a flange portion 254 for connecting the blade to the hub of rotor 106 (FIG. 1). Rear edge segment 208 is arranged on the wound body. The rear edge segment has a supporting structure 220, as well as shell elements arranged on the suction side 222 and the pressure side 224. In FIG. 2, only shell elements 210, 210', 210" on the pressure side are shown. Shell elements 210, 210', 210" are arranged adjacent each other along the rotor blade's longitudinal extension 226. To enable rear edge segment 208 to be joined to one or more trailing edges of the rotor blade (not shown), rear edge segment 208 has end edges 212, 212', 212" and respective transition regions 214.

Cover lips 216, 216' and 216" which overlap transition region 207 and the edge 209 of rear edge segment 208 are arranged at the transition region between the wound body 206 of inner blade portion 204 and rear edge segment 208 with the respective shell segments 210, 210', 210". These cover lips close the gap that ensues and simultaneously allow inner blade portion 204 to move relative to rear edge segment 208.

Figure 3:
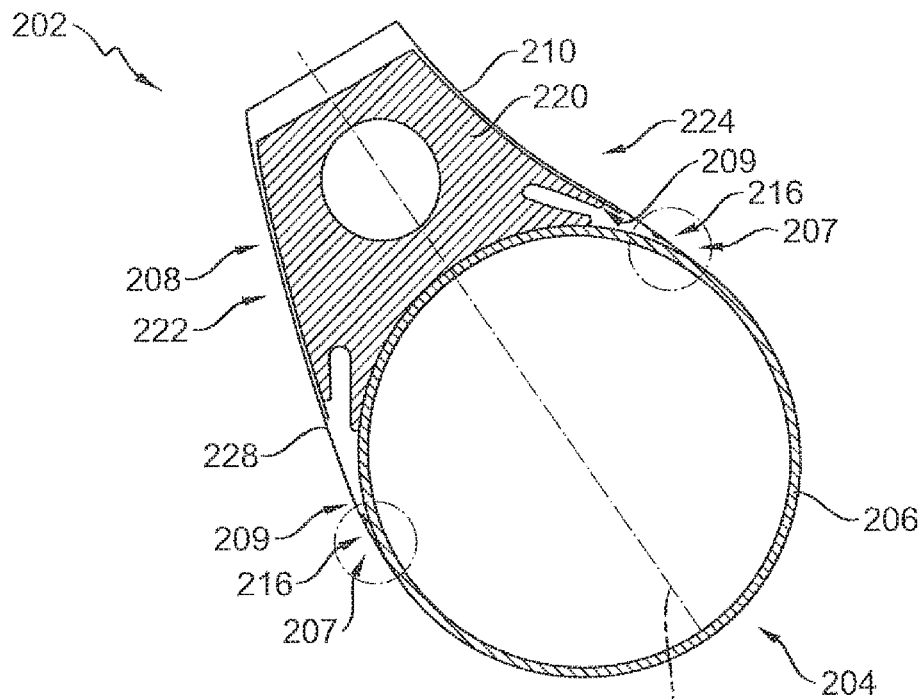
FIG. 3 shows a cross-sectional view of the rotor blade segment shown in FIG. 2.

FIG. 3 shows a cross-sectional view of a rotor blade segment 202, the sectional plane being perpendicular to the rotor blade's longitudinal extension 226 (see FIG. 2). Here, rotor blade segment 202 consists of inner blade portion 204 and rear edge segment 208. Inner blade portion 204 comprises wound body 206. On both suction side 222 and pressure side 224, cover lips 216 are arranged between the shell segments on suction side 228 and the shell segment on pressure side 210. As can be seen from FIG. 3, cover lips 216 allow a smooth transition from the contour of inner blade portion 204 or wound body 206 to the contour of the shell segment on suction side 228 and the shell segment on pressure side 210. By this means, aerodynamically disadvantageous phenomena such as turbulence at the transition 207 between inner blade portion 204 and rear edge segment 208 are reduced in any case and at best prevented.

Figure 4:
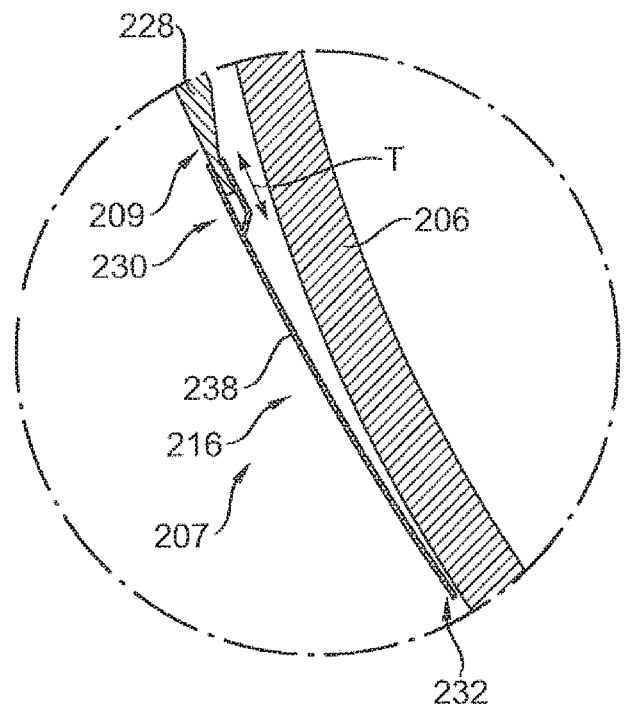
FIG. 4 shows a detail view of the cross-sectional view of the rotor blade segment shown in FIG. 3.
Figure 8:
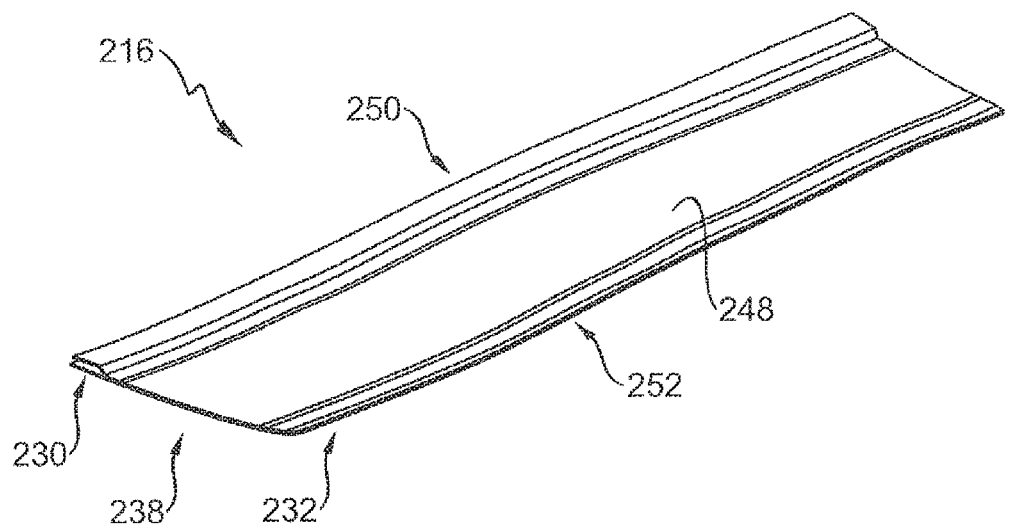
FIG. 8 shows a perspective view of a cover lip, as shown in FIGS. 1 to 7.

FIGS. 4 and 8 show an enlarged view of cover lip 216. Cover lip 216 has a base member 238 with a first end 250, on which a pocket 230 of depth T and a pocket base 247 are formed, and with a second end 252 arranged opposed the first end and on which an attachment portion 232 is arranged. Cover lip 216 is fixed, in particular adhesively bonded to wound body 206 by means of attachment portion 232. An edge 209 of rear edge segment 208 or an edge 209 of the shell segment on suction side 228 is movably received in pocket 230. If the shell segment of suction side 228 moves, for example as a result of forces and moments caused by blade rotation, cover lip 216 allows relative movement of edge 209 in some regions in the direction of depth T of pocket 230, and toleration of such movement by means of pocket 230. In any case, the surface remains closed in an aerodynamically advantageous and secure manner in the region of transition 207 between inner blade portion 204 and rear edge segment 208, even in the case, to be expected during operation, in which inner blade portion 204 moves relative to rear edge segment 208.

Figure 5:
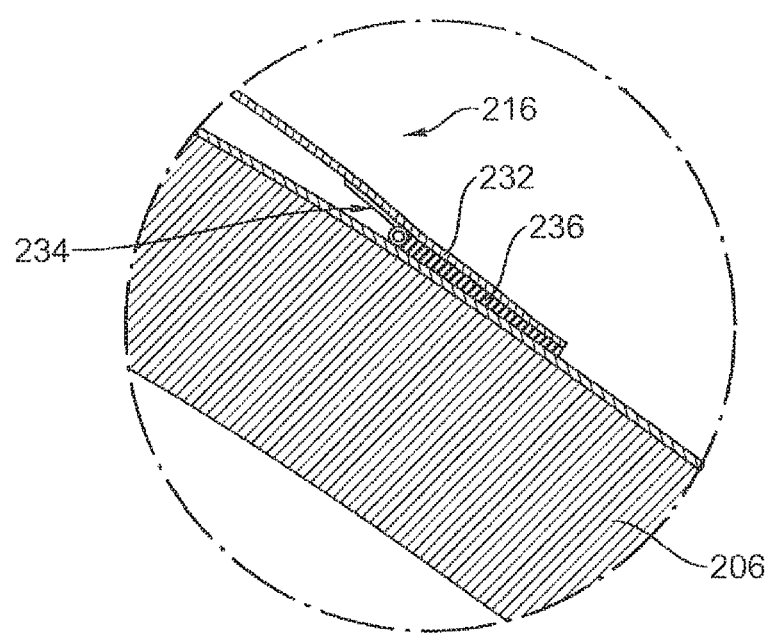
FIG. 5 shows a detail view of a portion of a cover lip, as shown in FIG. 4.

The attachment portion of cover lip 216 and the attachment of cover lip 216 to wound body 206 are shown in detail in FIG. 5. Cover lip 216 is joined to wound body 206 with the aid of an adhesive layer 236. A sealing profile 234 is introduced into the space between wound body 206 and cover lip 216. This serves in particular as an assembly aid and to simplify assembly of cover lip 216, which is arranged at an incline or in a wedge shape relative to winding body 206. The shape of sealing profile 234 results in rounding of the adhesive layer, thus reducing the notch effect at the edge of the adhesive layer. This improves the join between wound body 206 and cover lip 216 in structural/mechanical terms.

Figure 6:
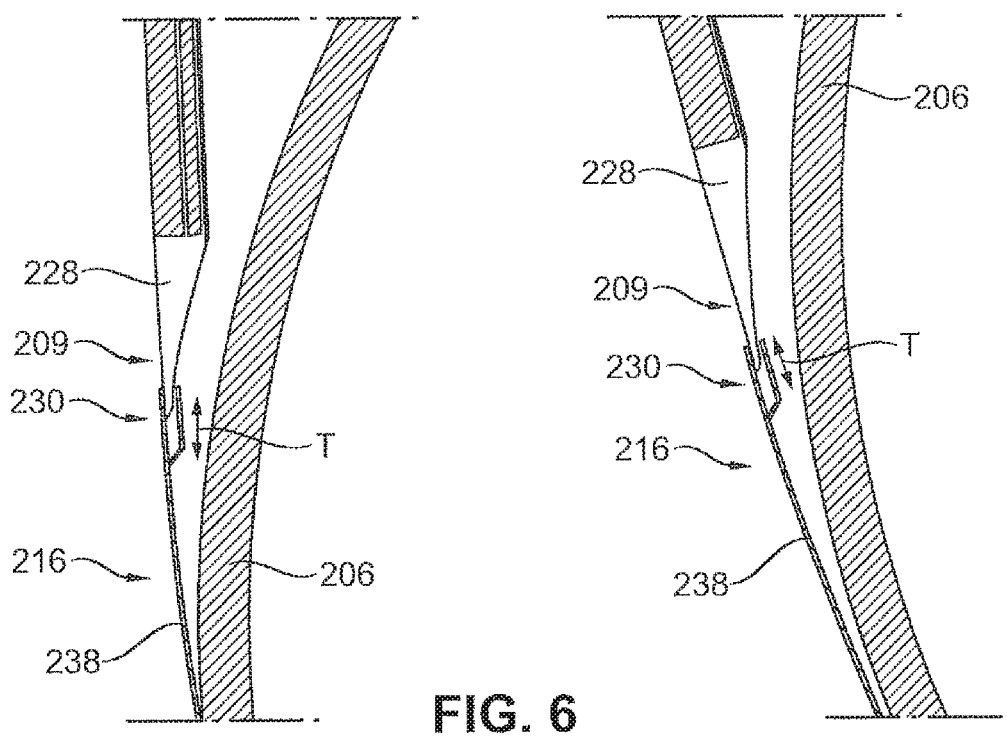
FIG. 6 shows further detail views of a rotor blade segment, as shown in FIG. 2.

FIG. 6 shows further detailed views of cover lip 216 and its interaction with wound body 206 and with the edges of rear edge segment 208 or the respective shell elements 228. As FIG. 6 clearly shows, the respective shell segment 228 is received movably in the direction of depth T in pocket 230 and can be moved here toward the pocket base 247 or in the opposite direction without leaving pocket 230 or contacting pocket base 247.

Figure 7:
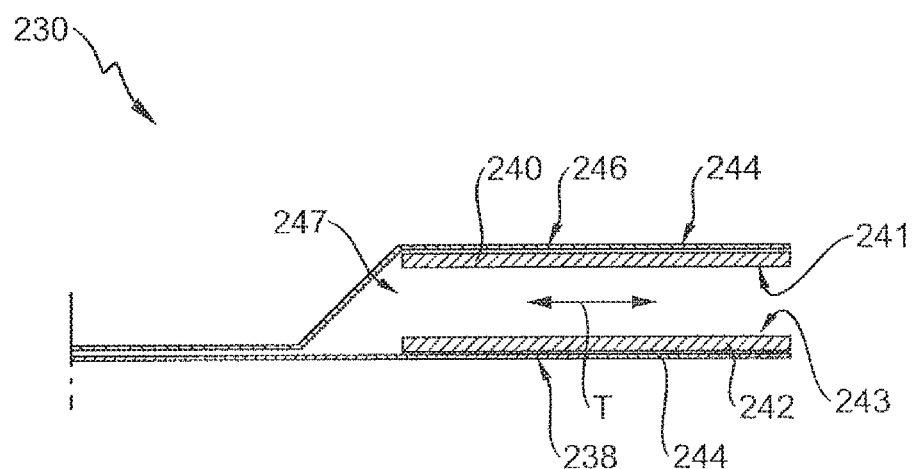
FIG. 7 shows a cross-sectional view of a cover lip, as shown in FIGS. 1 to 6.

FIG. 7 shows a cross-sectional view of a pocket 230. The pocket itself is formed here by a portion of base member 238 and a pocket shell 246 joined securely to base member 238. Base member 238 and pocket shell 246 are typically made of a fiber-reinforced plastic. A first anti-friction member 240 with a first anti-friction surface 241, and a second anti-friction member 242 with a second anti-friction surface 243 are joined to base member 238 or pocket shell 246.

One edge of the rear edge segment 208 or a respective shell segment slides on anti-friction surfaces 241, 243 of anti-friction members 240 and 242. Anti-friction members 240 and 242 consist partly, in any case, of a thermoplastic plastic, such that anti-friction surfaces 241, 243 are formed thereof. A fabric laminate 244 is introduced, typically rolled into each of anti-friction members 240 and 242 on the side facing away from the inside of the pocket. This fabric laminate 244 allows the respective anti-friction members 240 and 242 to be joined on the fabric laminated side to the matrix of a fiber-reinforced plastic of base member 238 and of pocket shell 246. This allows the thermoplastic component of the first anti-friction member 240 and of the second anti-friction member 242 to be joined in a durable and stable manner to base member 238 and pocket shell 246, even if, in the region of edge 209 at least, the base member is made of a fiber-reinforced plastic with a thermosetting matrix.

FIG. 8 shows a perspective view of a cover lip 216. Cover lip 216 has an attachment portion 232 and a base member 238. Pocket 230 is arranged on the side opposite attachment portion 232.

LIST OF REFERENCE SIGNS USED

100 Wind turbine
102 Tower
104 Nacelle
106 Rotor
110 Spinner
200 Rotor blades
201 Rotor blade root
202 Rotor blade segment
204 Inner blade portion
205 Profile depth direction
206 Wound body
207 Transition region
208 Rear edge segment
209 Edge of the rear edge segment
210, 210', 210" Shell segments on the pressure side
212, 212', 212" End edges
214 Transition regions of the end edges
216, 216', 216" Cover lip
218 Seal element
220 Supporting structure
222 Suction side
224 Pressure side
226 Longitudinal extension of the rotor blade
228 Shell segment on the suction side
230 Pocket
232 Attachment portion
234 Sealing profile
236 Adhesive
238 Base member
240 First anti-friction member
241 First anti-friction surface
242 Second anti-friction member
243 Second anti-friction surface
244 Fabric laminate
246 Pocket shell
247 Pocket base
248 Cover lip base member
250 First end
252 Second end
254 Cross-section of the inner blade portion

The invention claimed is:

1. A rotor blade for a wind turbine, comprising:
a rotor blade root for fixing the rotor blade to a hub of the wind turbine;
an inner blade portion extending from the rotor blade root in a direction of a longitudinal extension of the rotor blade;
a rear edge segment that increases a depth of the rotor blade in a profile depth direction in a region of the inner blade portion, wherein the rear edge segment is coupled to the inner blade portion and has an edge facing the inner blade portion; and
a cover lip adapted to a contour of the edge of the rear edge segment and overlapping the edge and a transition region defined by an outer surface gap between an outer surface of the inner blade portion and an outer surface of the edge of the rear edge segment, such that the cover lip closes the outer surface gap and allows the inner blade portion to move relative to the rear edge segment,
wherein the cover lip has a main portion and a pocket, wherein the cover lip overlaps the outer surface of the inner blade portion and the outer surface of the edge of the rear edge segment to cover the outer surface gap, and
wherein the pocket has a depth, and wherein the edge of the rear edge segment is received movably along the depth of the pocket.

2. The rotor blade according to claim 1, wherein the cover lip extends in sections in the direction of the longitudinal extension of the rotor blade.

3. The rotor blade according to claim 1, wherein the cover lip has a base member made of a fiber-reinforced plastic.

4. The rotor blade according to claim 3, wherein the base member has a first end and a second end, wherein the pocket is arranged at the first end, and wherein an attachment portion for attachment to the inner blade portion is arranged at the second end opposite the pocket.

5. The rotor blade according to claim 1, wherein the pocket has one or more anti-friction members with an anti-friction surface for slidingly receiving the edge of the rear edge segment.

6. The rotor blade according to claim 5, wherein the anti-friction surface is made of a thermoplastic plastic.

7. The rotor blade according to claim 6, wherein the thermoplastic plastic is selected from the list: polyoxymethylene, polyethylene terephthalate, polyamide 6, polyketone, polyvinylidene fluoride and polypropylene.

8. The rotor blade according to claim 1, wherein the inner blade portion has a circular or oval cross-section.

9. The rotor blade according to claim 1, wherein the inner blade portion is provided in the form of a wound body.

10. A wind turbine, comprising:
a tower;
a nacelle mounted rotatably on the tower;
a rotor mounted rotatably on the nacelle; and
a plurality of rotor blades attached to the rotor, wherein one or more of the plurality of rotor blades is the rotor blade according to claim 1.

11. The rotor blade according to claim 1, wherein the cover lip is an integral piece that extends in the direction of the longitudinal extension of the rotor blade.

12. The rotor blade according to claim 1, wherein the inner blade portion has an elliptical cross-section.

13. The rotor blade according to claim 1, wherein the cover lip is adapted to the contour of opposing sides of the edge of the rear edge segment.

14. A rotor blade for a wind turbine, comprising:
a rotor blade root for fixing the rotor blade to a hub of the wind turbine;
an inner blade portion extending from the rotor blade root in a direction of a longitudinal extension of the rotor blade;
a rear edge segment that increases a depth of the rotor blade in a profile depth direction in a region of the inner blade portion, wherein the rear edge segment is coupled to the inner blade portion and has an edge facing the inner blade portion; and
a cover lip overlapping the edge and arranged in a transition region from the inner blade portion to the edge of the rear edge segment,
wherein the cover lip has a pocket with a depth, wherein the edge of the rear edge segment is received movably along the depth of the pocket,
wherein the pocket has one or more anti-friction members with an anti-friction surface for slidingly receiving the edge of the rear edge segment,
wherein the anti-friction surface is made of a thermoplastic plastic, and
wherein a fabric laminate is arranged on a side of the anti-friction member facing away from the anti-friction surface.

15. The rotor blade according to claim 14, wherein the cover lip has a base member made of a fiber-reinforced plastic, wherein the fiber-reinforced plastic includes a matrix with fibers embedded in the matrix, and wherein the fabric laminate is joined to the matrix of the fiber-reinforced plastic.

16. The rotor blade according to claim 15, wherein the fabric laminate is embedded in the matrix of the fiber-reinforced plastic.

17. A rotor blade for a wind turbine, comprising:
- a rotor blade root for fixing the rotor blade to a hub of the wind turbine;
- an inner blade portion extending from the rotor blade root in a direction of a longitudinal extension of the rotor blade;
- a rear edge segment that increases a depth of the rotor blade in a profile depth direction in a region of the inner blade portion, wherein the rear edge segment is coupled to the inner blade portion and has an edge facing the inner blade portion; and
- a cover lip adapted to a contour of the edge of the rear edge segment and overlapping the edge and a transition region defined by a surface gap between an outer surface of the inner blade portion and the edge of the rear edge segment, such that the cover lip closes the surface gap and allows the inner blade portion to move relative to the rear edge segment, wherein the cover lip has a base member, wherein the base member has a first end and a second end, wherein a the pocket is arranged at the first end, and wherein an attachment portion for attachment to the inner blade portion is arranged at the second end opposite the pocket and wherein a seal having a sealing profile is arranged on the attachment portion.

18. The rotor blade according to claim 17, wherein the seal is a rubber seal.

* * * * *